US007653893B2

(12) United States Patent
Neumann et al.

(10) Patent No.: US 7,653,893 B2
(45) Date of Patent: Jan. 26, 2010

(54) METHODS AND APPARATUS FOR IMPLEMENTING CHECKIN POLICIES IN SOURCE CODE CONTROL SYSTEMS

(75) Inventors: Douglas T. Neumann, Cary, NC (US); Brian D. Harry, Chapel Hill, NC (US); Edward R. Hintz, III, Raleigh, NC (US); Christian M. Lucas, Sammamish, WA (US); Jason Anderson, Redmond, WA (US); Sam Guckenheimer, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 693 days.

(21) Appl. No.: 11/071,933

(22) Filed: Mar. 4, 2005

(65) Prior Publication Data

US 2006/0200803 A1 Sep. 7, 2006

(51) Int. Cl.
*G06F 9/44* (2006.01)
*G06F 9/00* (2006.01)
*G06F 17/30* (2006.01)

(52) U.S. Cl. .................. 717/101; 717/120; 717/124; 713/100; 707/1

(58) Field of Classification Search ............. 717/120, 717/101, 124; 713/100; 707/1
See application file for complete search history.

(56) References Cited

U.S. PATENT DOCUMENTS

| 5,649,200 | A  | * | 7/1997  | Leblang et al. ........... 717/122 |
| 5,805,889 | A  | * | 9/1998  | Van De Vanter .......... 717/107 |
| 6,438,618 | B1 | * | 8/2002  | Lortz et al. ............... 719/318 |
| 6,993,755 | B1 | * | 1/2006  | Ungar ...................... 717/158 |
| 7,107,315 | B1 | * | 9/2006  | Rodriguez et al. ........ 709/206 |
| 7,266,808 | B2 | * | 9/2007  | Kolawa et al. ............ 717/126 |
| 7,278,106 | B1 | * | 10/2007 | Mason ..................... 715/744 |
| 7,398,237 | B2 | * | 7/2008  | Agostini et al. .......... 705/35 |
| 2002/0104071 | A1 | * | 8/2002 | Charisius et al. ......... 717/109 |

(Continued)

OTHER PUBLICATIONS

MSDN, "Walkthrough: Customizing Check-in Policies and Notes", Microsoft "this page is specific to Microsoft Visual Studio 2005/.NET Framework 2.0", pp. 1-3, http://msdn.microsoft.com/en-us/library/ms181281(VS.80).aspx.*
Cogan and Phan, "Customizing Check-In Policies in Visual Studio Team System", Sep. 6, 2006, pp. 1-38, http://www.ssw.com.au/ssw/standards/developerdotnet/Custom_Check-In_Policy_for_Visual_Studio_Team_System%20_v7.doc.*

(Continued)

*Primary Examiner*—Wei Y Zhen
*Assistant Examiner*—Chih-Ching Chow
(74) *Attorney, Agent, or Firm*—Wolf, Greenfield & Sacks, P.C.

(57) ABSTRACT

In one embodiment, a method and apparatus for automatically evaluating compliance of at least one source code file against at least one checkin policy. In a further embodiment, providing information about the compliance or non-compliance of the at least one source code file with the at least one checkin policy. In another embodiment, providing an option to override a policy failure and submit the at least one source code file to a source code repository. In one embodiment, in response to an override of a policy failure, providing a notification about the override of the policy failure. In some embodiments, an extensible framework enabling the installation of at least one checkin policy plugin, and providing a notification that at least one checkin policy plugin is not installed. In further embodiments, providing and using a work item association policy plugin, a unit tests policy plugin, and a static analysis policy plugin.

10 Claims, 14 Drawing Sheets

U.S. PATENT DOCUMENTS

2004/0261053 A1* 12/2004 Dougherty et al. .......... 717/101
2005/0015675 A1* 1/2005 Kolawa et al. ................ 714/38
2005/0160084 A1* 7/2005 Barrett .......................... 707/3
2006/0075218 A1* 4/2006 Barragy et al. .............. 713/100

OTHER PUBLICATIONS

Edward Bakker, "Extend Check-In Policies in Visual Studio Team System", pp. 1-3, Mar. 23, 2005, http://www.edwardbakker.nl/PermaLink,guid,8600ae36-f9c9-4e1f-b91e-63a469b6346e.aspx.*

* cited by examiner

METHODS AND APPARATUS FOR IMPLEMENTING CHECKIN POLICIES IN SOURCE CODE CONTROL SYSTEMS

FIELD OF INVENTION

The present invention relates to checkin policies for source code control systems.

BACKGROUND OF INVENTION

Organizations involved in software development may employ a source code control (SCC) system for managing source code assets produced by software developers. SCC systems provide numerous benefits to these organizations, including serving as a central source code repository for storing source code assets, retaining historical information about how source code assets have evolved over time, providing access to historical versions of the source code assets, and providing a mechanism for developers to share source code with team members.

SUMMARY OF INVENTION

In one embodiment, a method for use in a computer system, where the computer system comprises a source code repository that stores checked in source code, at least one checkin policy, and at least one source code file to be submitted to the source code repository. The method comprises an act of automatically evaluating compliance of the at least one source code file with the at least one checkin policy.

In another embodiment, at least one computer readable-medium encoded with a plurality of instructions in a computer system, where the computer system comprises a source code repository that stores checked in source code, at least one checkin policy, and at least one source code file to be submitted to the source code repository. The plurality of instructions, when executed, performing a method comprising an act of automatically evaluating compliance of the at least one source code file with the at least one checkin policy.

In another embodiment, at least one computer for use with a computer system comprising a source code repository that stores checked in source code, at least one checkin policy, and at least one source code file to be submitted to the source code repository, the at least one computer comprising at least one processor programmed to automatically evaluate compliance of the at least one source code file with the at least one checkin policy.

BRIEF DESCRIPTION OF DRAWINGS

In the drawings, each identical or nearly identical component that is illustrated in various figures is represented by a like numeral. For purposes of clarity, not every component may be labeled in every drawing. In the drawings.

DETAILED DESCRIPTION

Figure 1:
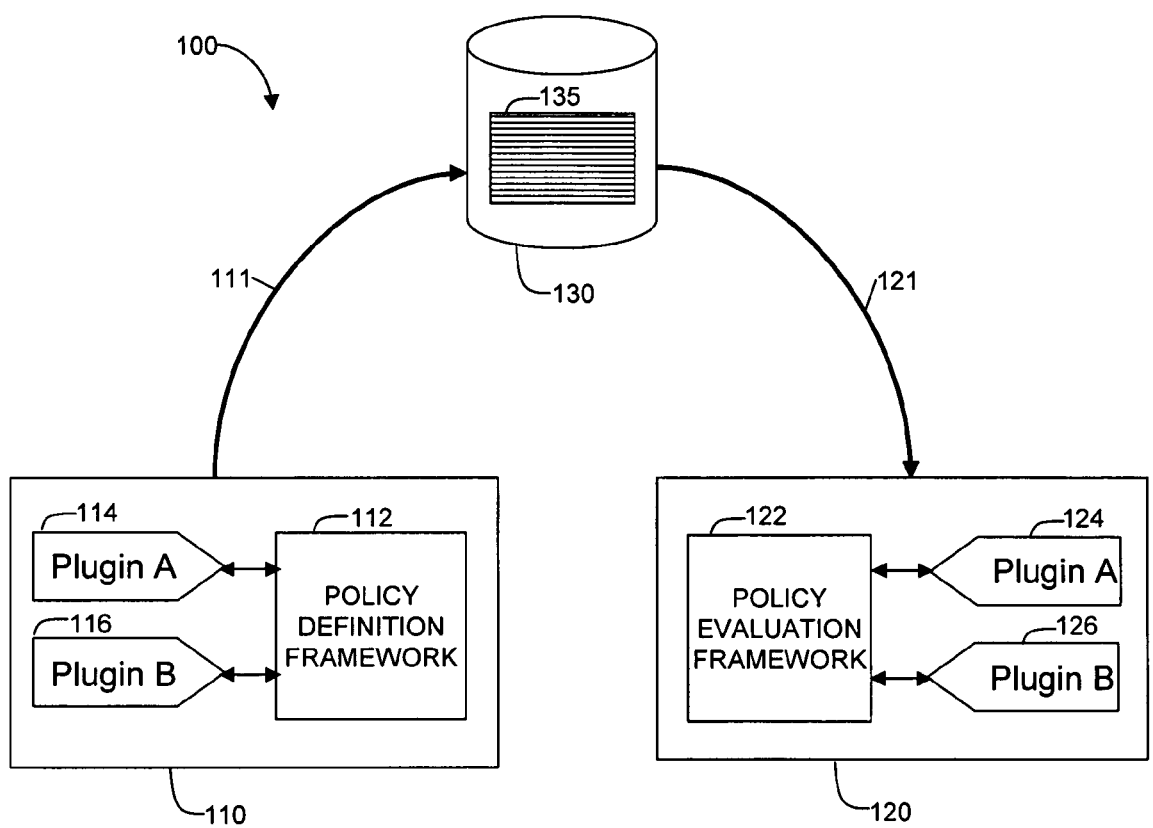
FIG. 1 is a block diagram of a system for policy definition, storage, and evaluation in accordance with one embodiment of the invention.

Current practice involves the establishment of rules and standards directed to the source code that can be submitted to a source code repository. These rules and standards, referred to as policies, are often informally communicated among team members and adherence is at the discretion and judgment of team members.

As described above, an organization may wish to establish checkin policies governing the source code that may be submitted to a source code repository. Some examples of checkin policies may include requirements that changes to the source code pass a set of automated tests of base functionality, that the source code cleanly compile, that a given source branch only accepts bug fixes to a specific release of the product, and that no source code changes be submitted that are not approved and reviewed by a central committee.

Applicants have appreciated that conventional approaches to checkin policy management are unreliable and unauditable since policies are informally communicated among team members and adherence is at the discretion of the developers. Applicants have further realized that policy management would be greatly improved by utilizing a mechanism that allows an organization to codify policies in a manner that allows their communication, evaluation, and enforcement to be handled automatically (e.g., in Integrated Development Environments (IDE) or using command-line checkin processes).

In accordance with various embodiments of the invention, a mechanism is provided that enables the definition of checkin policies, the dissemination of checkin policies, the automatic evaluation of checkin policies, the presentation of policy compliance information, and/or the enforcement of the checkin policies at the checkin process. In a further embodiment, an auditable process is provided for overriding a policy failure and submitting source code that is in violation of the checkin policies.

In accordance with another embodiment of the invention, an extensible checkin policy framework allows for the creation of new policy types using policy plugins. A further embodiment enables providing notification that the appropriate policy plugins are not installed on a client computer.

In some embodiments, policy type may include a work item association policy type, a unit tests policy type, a static analysis policy type, or any other policy type, as the invention is not limited in this respect.

The various embodiments of the invention may be used in a software development process, where source code files in a team project may be checked into a source code repository. The team project refers to one or more assets associated with a software development process, including source code for the software application being developed. The source code repository may be accessible to the development team members and, as previously stated, checkin policies may be put in place to aid in controlling the source code that is checked into the source code repository. The checkin policies may possess associated scopes so as to apply to specific team projects, specific trees, branches or folders in the source code repository, specific versions of source code and/or specific source code files. As such, it should be appreciated that processes described herein may be used in such a manner that the checkin policies may be different for each source code file that is being submitted for checkin, and the processes are by no means limited to the case where checkin policies apply uniformly to all source code in a team project.

FIG. 1 shows an illustrative system implementing one embodiment of the invention in which one or more policy definitions may be defined, stored, and/or evaluated. System 100 includes a policy definition client computer 110, a policy evaluation client computer 120, and a policy storage server 130. A policy definition framework 112 resides on the policy definition client computer 110, with policy plugin A 114 and policy plugin B 116 being utilized by policy definition framework 112 to enable a policy definition process.

Policy plugin A 114 and/or B 116 represent plugins for different policy types, where a policy type may encompass a general category of policies, and numerous specific policies may belong to a given policy type.

Any number of different policy plugins may be utilized by the policy definition framework 112, as the invention is not limited in this respect. For example, FIG. 1 shows two policy plugins A 114 and B 116 residing on policy definition client computer 110 and two policy plugins A 124 and B 126 residing on policy evaluation client computer 120.

Policy plugins may allow the policy definition framework 112 and policy evaluation framework 122 to handle new policy types by utilizing corresponding new policy plugins installed on the policy definition client computer 110 and the policy evaluation client computer 120. Furthermore, the policy plugins may be created and supplied by any third party. Therefore, the policy framework may remain constant and new policy types may be added or removed from the system.

A policy definition may define a specific policy, and the policy definition may be created, deleted, or modified by the policy definition framework 112 by calling policy plugin A 114 and/or policy plugin B 116. The policy definition framework 112 may receive inputs from a user to determine the specific attributes of a policy definition. Upon the creation and/or modification of a policy, the policy definition may be transmitted 111 from the policy definition client computer 110 to the policy definitions store 135 on the policy storage server 130.

The policy definitions store 135 may comprise one or more policy definitions stored in any format. For instance, the policy definitions store 135 may contain one or more policy definitions, and each policy definition may be stored as an individual file, across multiple files, or multiple definitions may be stored in one file. In one embodiment, policy definitions are stored (and transmitted) in a serialized representation. An example of such a serialized representation may involve encoding a policy definition using the Extensible Markup Language (XML) or any other language, as the invention is not limited in this respect.

Furthermore, a list of policies (not shown) may be stored in any location on the system 100, as the invention is not limited in this respect. For example, the list of policies may be stored on the policy storage server 130, which may be retrieved by the policy definition framework 112 and the policy evaluation framework 122.

Policy evaluation framework 122 resides on policy evaluation client computer 120, and policy plugin A 124 and/or policy plugin B 126 may be utilized by the policy evaluation framework 122 to perform a policy evaluation process. Policy definitions may be retrieved 121 from the policy definitions store 135 and may be processed by the policy plugins A 124 and B 126. To evaluate policy compliance, policy evaluation framework 122 may receive checkin information and may evaluate the policy compliance of source code being submitted to a source code repository (not shown). The checkin information may include a list of source code files that may be submitted to the source code repository, a list of currently selected work items associated with the source code files, release note information, checkin comments, and any other information, as the invention is not limited in this respect. In some embodiments, an extensible checkin information system may be provided that enables the checkin information to be tailored. For example, a project or team leader may utilize the extensible checkin information system to specify additional checkin information that should be submitted for the checkin of source code for a project. The policy evaluation process may be performed by the policy plugins A 124 and B 126, which may be called from the policy evaluation framework 122.

In accordance with one embodiment, a new policy may be created, and/or an existing policy may be edited, deleted, or disabled/enabled.

Figure 2A:
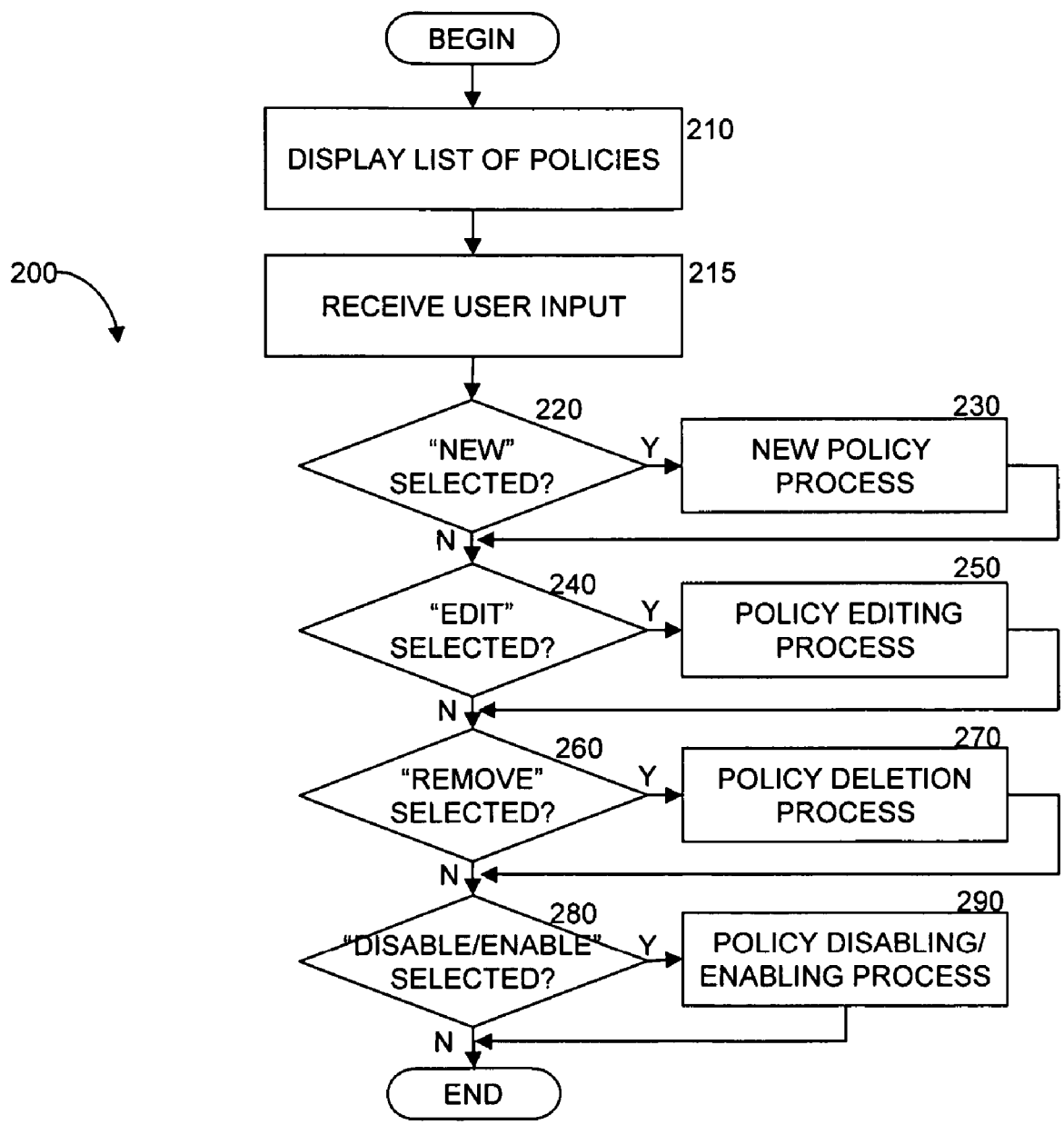
FIG. 2a is a flow chart showing a process for allowing the initiation of processes to create a new policy, or edit, delete, or disable/enable an existing policy in accordance with one embodiment of the invention.

FIG. 2a is a flow chart illustrating one embodiment of a process 200 allowing a user to initiate a process to create a new policy, edit an existing policy, delete an existing policy, and/or disable/enable an existing policy. Process 200 may be performed by the policy definition framework 112, or by any suitable component, as the invention is not limited in this respect.

In act 210, a list of policies is displayed, which allows a user to select one or more policies in the list of policies. The display may also enable a user to input information or comments to initiate a new policy definition process, a policy editing process, a policy deletion process, and/or a policy disablement/enablement process.

Figure 2B:
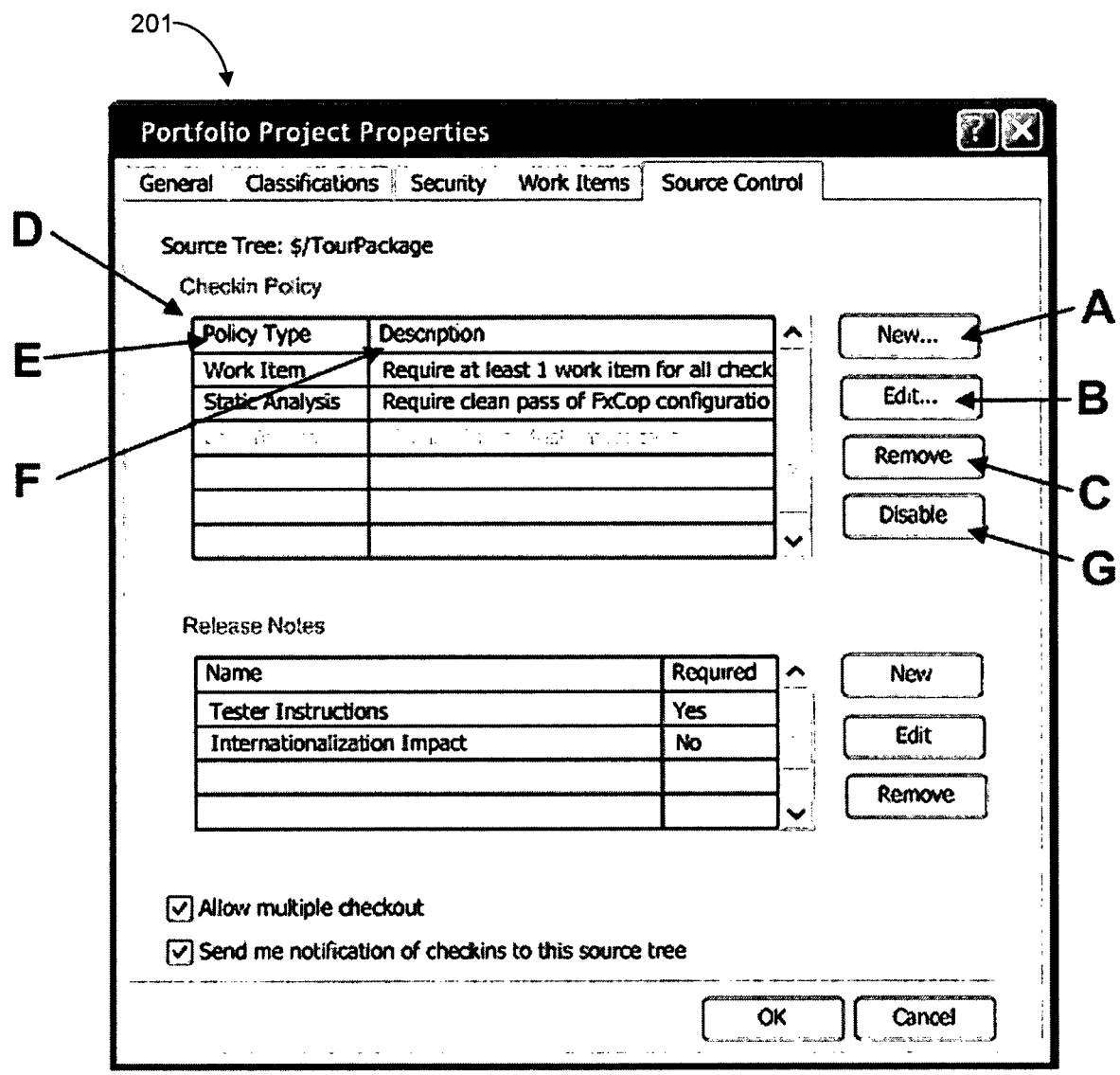
FIG. 2b is an illustration of a policy definition user interface in accordance with one embodiment of the invention.

FIG. 2b shows an illustrative interface implementing a policy definition graphical user interface 201 that displays a list of policies (display D) with a first column containing a policy type of each listed policy (column E) and a second column containing a description of each listed policy (column F). Furthermore, the policy definition graphical user interface 201 possesses input buttons for initiating a new policy definition process (button A), a policy editing process (button B), a policy deletion process (button C), and a policy disablement/enablement process (button G). The user may select any of the abovementioned input buttons from the policy definition graphical user interface 201, and process 200 proceeds to invoke the appropriate actions based on the user selection. It should be appreciated that the invention is not limited to the graphical user interface illustrated, and any other interface may be utilized.

In act 215 (FIG. 2a), process 200 receives a user input, and proceeds to evaluate the input in the following acts.

In act 220, process 200 determines whether the input associated with a new policy definition process is selected. When the input associated with a new policy definition process is selected, process 200 proceeds to act 230 where a policy definition process for creating a new policy is executed.

In act 240, the process 200 determines whether the input associated with a policy editing process is selected. When the input associated with a policy editing process is selected, the process 200 proceeds to act 250 where a policy editing process for editing an existing policy is executed.

In act 260, process 200 determines whether the input associated with a policy deletion process is selected. When the input associated with a policy deletion process is selected, process 200 proceeds to act 270 where a policy deletion process for deleting an existing policy is executed.

In act 280, process 200 determines whether the input associated with a policy disablement/enablement process is selected. When the input associated with a policy disablement/enablement process is selected, process 200 proceeds to act 290 where a policy disablement/enablement process for disabling/enabling an existing policy is executed.

Figure 3:
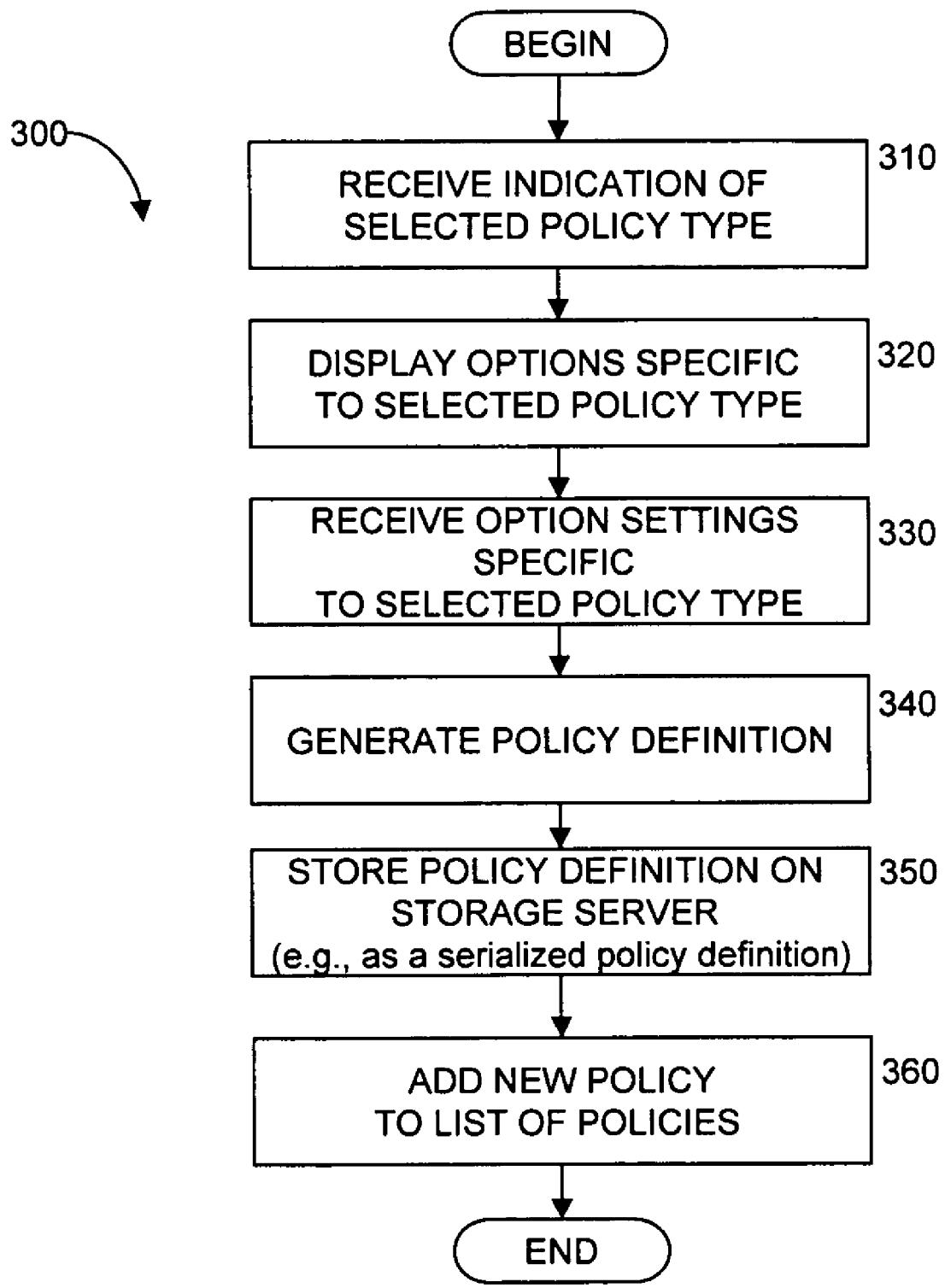
FIG. 3 is a flow chart showing a process for defining a new policy in accordance with one embodiment of the invention.

FIG. 3 is a flow chart illustrating one embodiment of a policy definition process 300 for creating a new policy, which is an example of a process for defining a policy, but numerous other policy definition processes are possible and the invention is not limited to the example. The policy definition process 300 may be executed by the policy definition framework 112 in conjunction with the policy plugins (e.g., 114 or 116), or any other component, as the invention is not limited in this respect.

In act 310, an indication of the policy type desired is received. The indication of the chosen policy type may be provided by a user in response to being provided a list of policy types available on the definition client computer 110, or in any other suitable way. For example, each policy plugin (e.g., plugin A 114 and plugin B 116) installed on the policy definition client computer 110 may enable a corresponding policy type. In system 100, plugin A 114 may correspond to a first policy type A, and plugin B 116 may correspond to a second policy type B. The specification of the selected policy type may be received by the policy definition framework 112 or by any other component, as the invention is not limited in this respect.

In act 320, options specific to the selected policy type may be displayed to the user. The display of the options specific to the selected policy type may be controlled by the policy framework and/or the policy plugin associated with the selected policy type, and may include any number of settings that may be chosen to define a policy. For instance, in the case of a static analysis policy type, the options specific to the policy type may include that source code static analysis was performed on the source code being checked in, binary code static analysis was performed on the compiled source code being checked in, no build errors were present in the source code being checked in, and/or no build warnings were present in the source code being checked in, or any other suitable requirements, as the invention is not limited to use with any particular type of policy or the manner in which it is defined.

The user may then select requirements desired for the policy definition being created based on the display of the options specific to the selected policy type. The selected requirements may take the form of option settings chosen in response to the display of the options specific to the selected policy type.

In act 330, the chosen option settings specific to the selected policy type may be received. The policy definition framework 112 and/or the policy plugin (e.g., 114 or 116) associated with the selected policy type may receive the chosen option settings.

In act 340, a policy definition is generated based on the chosen option settings specific to the selected policy type. The policy definition may be generated by the policy definition framework 112 in concert with the policy plugin (e.g., 114 or 116) or by any other component, as the invention is not limited in this respect. The generated policy definition may be represented as a policy definition object, when represented in an objected oriented programming language, or via any other representation, as the invention is not limited in this respect. For instance, the policy definition may be represented in a serialized representation using XML or any other language, as via the invention is not limited in this respect.

In act 350, the policy definition is stored on the policy storage server 130. The policy definition may be stored in any format, as the invention is not limited in this respect. For example, the policy definition may be encoded as a serialized policy definition using XML and saved as a file on the policy storage server 130. Process 300 then proceeds to act 360 where the new policy may be added to the list of policies. Furthermore, a user may specify whether the policy applies to one or more team projects, to specific versions of source code, to one or more branches, trees and/or folders of the source code repository.

Figure 4:
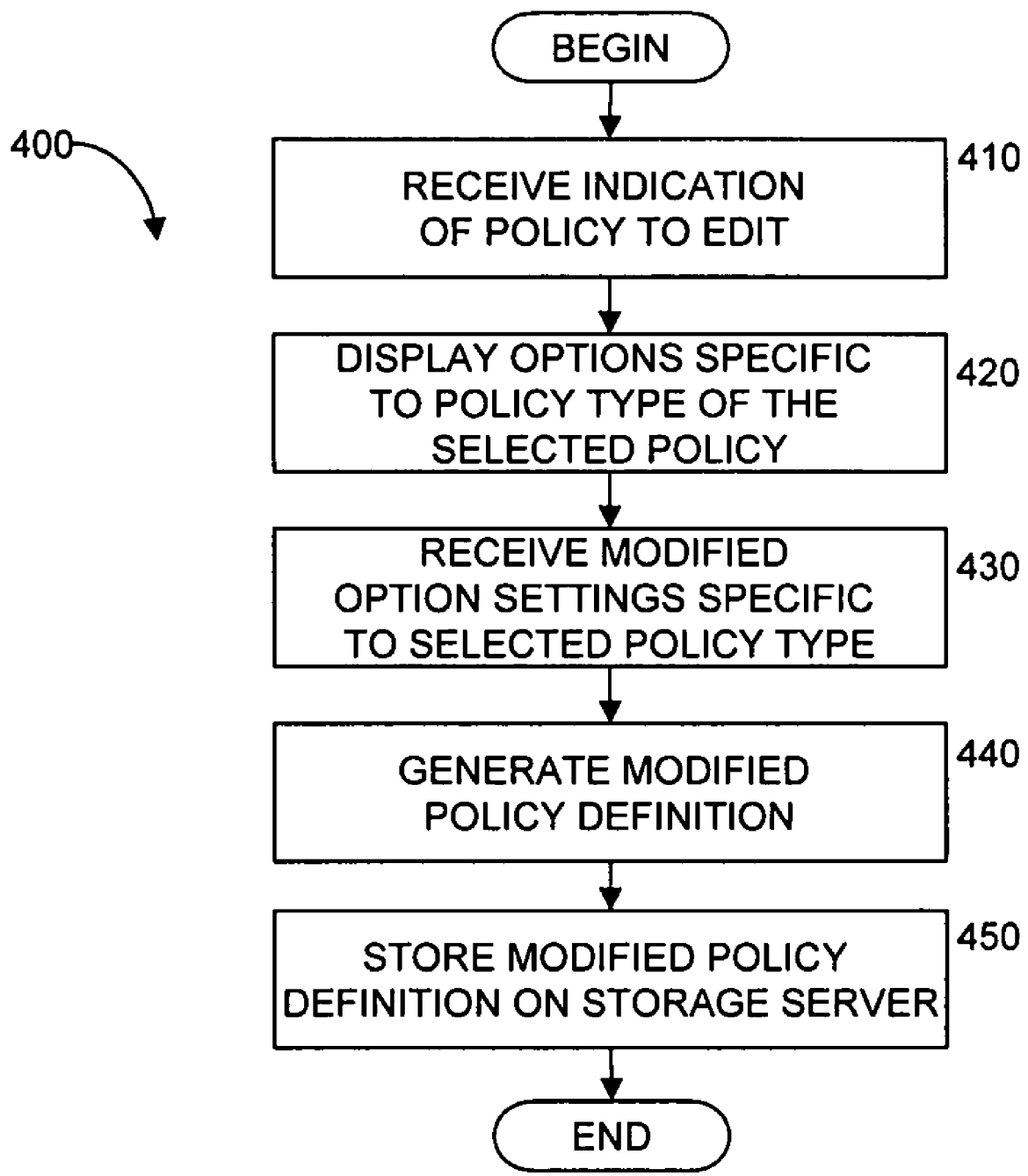
FIG. 4 is a flow chart showing a process for editing an existing policy in accordance with one embodiment of the invention.

FIG. 4 is a flow chart illustrating one embodiment of a process 400 for editing an existing policy, which is an example of a process for modifying a policy, but numerous other policy editing processes are possible and the invention is not limited to the example. The policy editing process 400 may be controlled by the policy definition framework 112 in conjunction with the policy plugins (e.g., 114 or 116) or any other component, as the invention is not limited in this respect. A user may select which policy they desire to edit from a list of policies. The list of policies may be presented by the process 400, or by another process, with the selection being passed to process 400. For instance, in connection with process 200, illustrated in FIG. 2, the user may select the policy to edit from the display of the list of policies presented in act 210. The selection may then be passed to the policy editing process 400.

In act 410, an indication of the policy to be edited is received by the policy definition framework 112 or by any other component, as the invention is not limited in this respect.

In act 420, options specific to the policy type of the selected policy are displayed. The display of the options specific to the selected policy may be controlled by the policy definition framework 112 and/or the policy plugin (e.g., 114 or 116) associated with the policy type of the selected policy, or by other component. The options specific to the selected policy type may include any number of settings that may be chosen to define the policy. The user may then modify the option settings for the policy being edited based on the display of the options specific to the type of the selected policy.

In act 430, the modified option settings for the selected policy may be received by the policy definition framework 112 and/or the policy plugin (e.g., 114 or 116) associated with the type of the selected policy.

In act 440, a modified policy definition may be generated based on the modified option settings of the policy type of the selected policy. The modified policy definition may be generated by the policy plugin (e.g., 114 or 116) or by any other component, as the invention is not limited in this respect. The modified policy definition may be represented as a policy definition object, when represented in an object oriented programming language, or using any other representation, as the invention is not limited in this respect. For instance, the policy definition may be represented in a serialized representation using XML or any other language, as the invention is not limited in this respect.

In act 450, the modified policy definition is stored on the policy storage server 130. The modified policy definition may replace the previous policy definition that was present prior to performing the editing process 400, or may be stored in addition to the prior policy definition.

Figure 5:
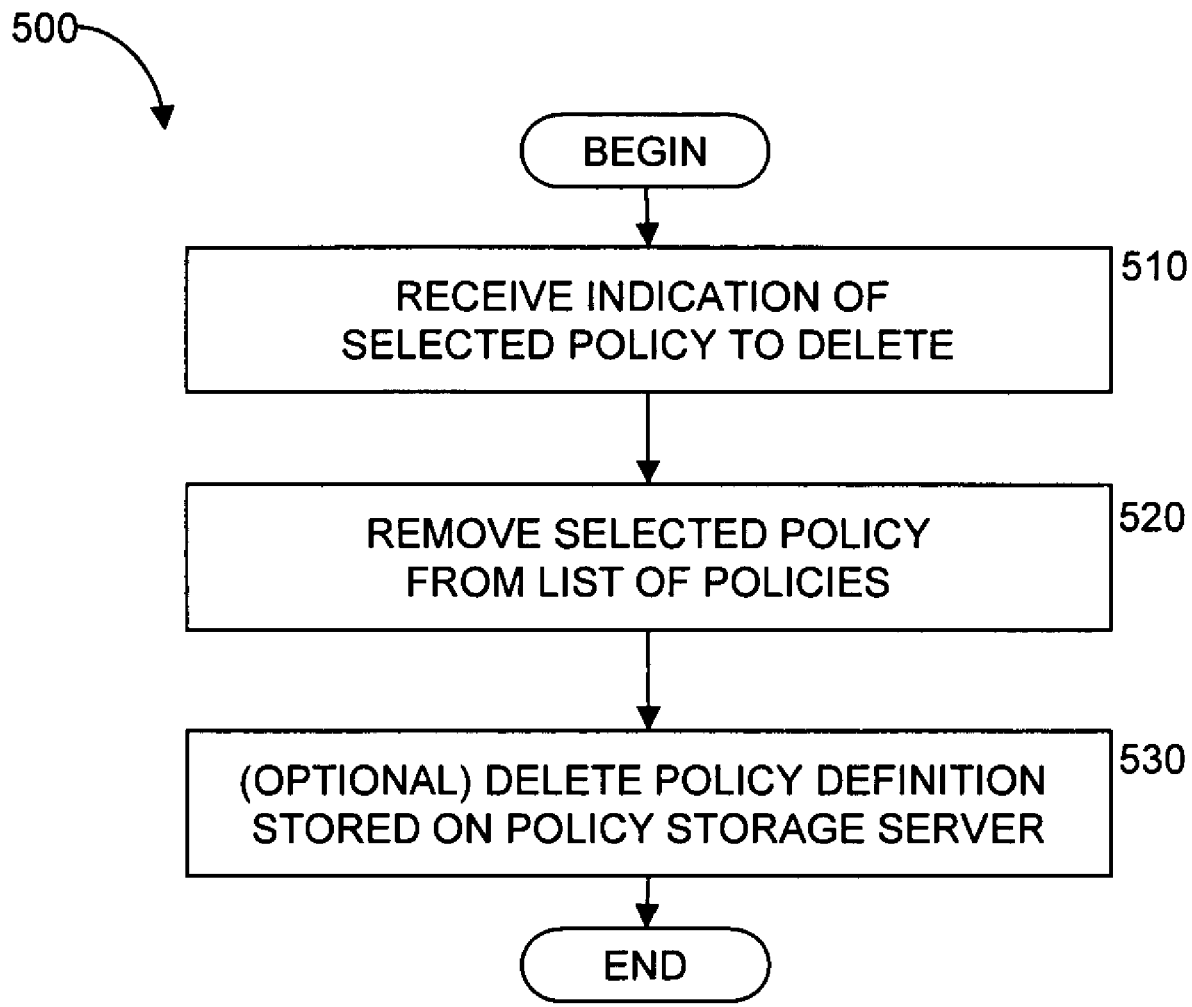
FIG. 5 is a flow chart showing a process for deleting an existing policy in accordance with one embodiment of the invention.

FIG. 5 is a flow chart illustrating one embodiment of a process 500 for deleting an existing policy, which is an example of a process for deleting a policy, but numerous other policy deleting processes are possible and the invention is not limited to the example. The policy deletion process 500 may be controlled by the policy definition framework 112 or any other component, as the invention is not limited in this respect. A user may select which policy they desire to delete from a list of policies, or in any other suitable way. Such a selection may be performed during execution of process 500, or during execution of another process that passes the selection to process 500. For instance, in connection with process 200, illustrated in FIG. 2, the user may select the policy to be deleted from the display of the list of policies presented in act 260, and the selection may be passed to the policy deletion process 500.

In act 510, an indication of the selected policy is received by the policy definition framework 112 or by any other component, as the invention is not limited in this respect.

In act 520, the selected policy is removed from the list of policies, and in act 530, the associated policy definition stored in the policy definitions store 130 may be optionally deleted.

Figure 6:
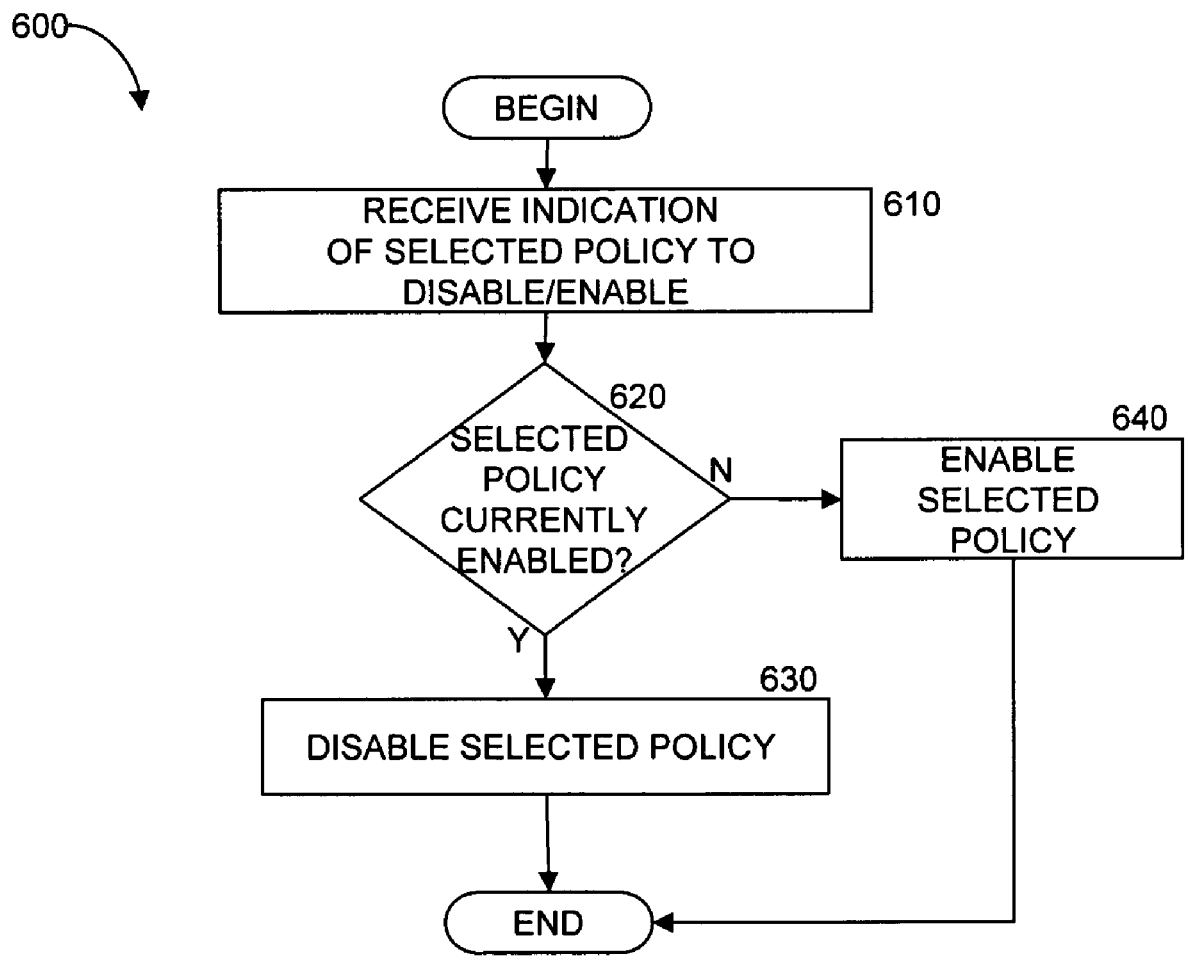
FIG. 6 is a flow chart showing a process for disabling/enabling an existing policy in accordance with one embodiment of the invention.

FIG. 6 is a flow chart illustrating one embodiment of a process 600 for disabling and enabling an existing policy, which is an example of a policy disabling and enabling process, but numerous other policy disabling and enabling processes are possible and the invention is not limited to the example. For example, the policy enabling process may be separate from the policy disabling process.

In practice, it may be desirable to allow policies to be disabled and enabled, for example, to allow users to relax checkin requirements while preserving policy settings. The policy disabling and enabling process 600 may be controlled by the policy definition framework 112 or by any other component, as the invention is not limited in this respect. A user may select which policy they desire to disable or enable from a list of policies. Such a selection may be performed during execution of process 600, or during execution of another process that passes the selection to process 600. For instance, in connection with process 200, illustrated in FIG. 2, the user may select the policy to enable or disable from the display of the list of policies presented in act 210, and the selection may then be passed to the policy disabling/enabling process 600.

In act 610, an indication of the selected policy is received by the policy definition framework 112 or by any other component, as the invention is not limited in this respect.

In act 620, a determination is made as to whether the selected policy is currently enabled or disabled. An indication of the disabled/enabled state of the selected polices may be contained in the list of policies or in any other location, as the invention is not limited in this respect.

When the selected policy is currently enabled, process 600 proceeds to act 630 where the selected policy is disabled, and when the disabled/enabled state is contained in the list of policies, an indication of the new disabled state of the selected policy may be stored in the list of policies.

When the selected policy is currently disabled, process 600 proceeds to act 640 where the selected policy is enabled, and when the disabled/enabled state is contained in the list of policies, an indication of the new enabled state of the selected policy may be stored in the list of policies.

Figure 7A:
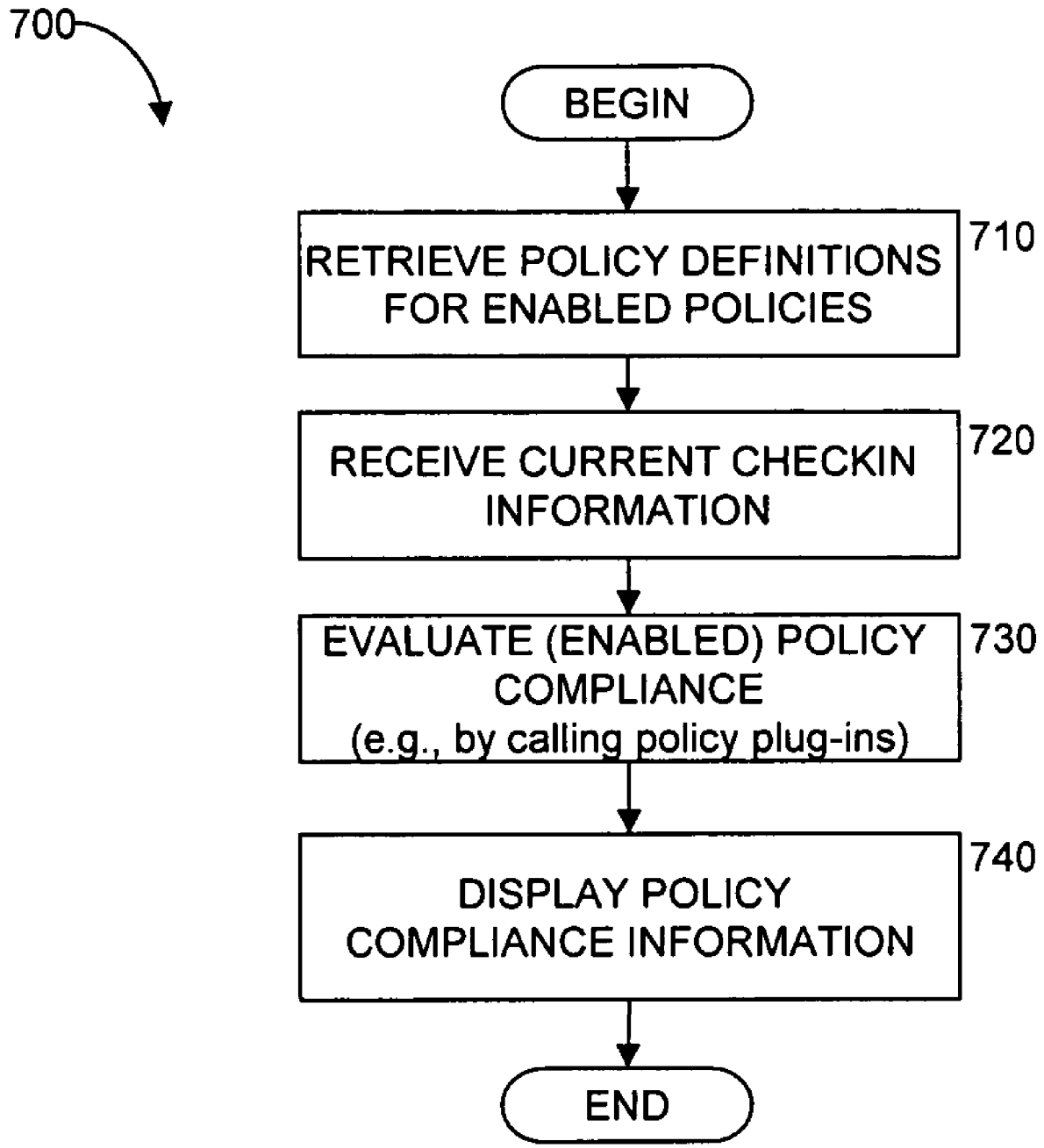
FIG. 7a is a flow chart showing a process for evaluating policy compliance in accordance with one embodiment of the invention.

FIG. 7a is a flow chart illustrating one embodiment of a policy evaluation process 700 for evaluating the policy compliance of source code that may be, or will be, submitted to the source code repository, which is an example of a policy evaluation process, but numerous other policy evaluation processes are possible and the invention is not limited to the example. The policy evaluation process 700 may be controlled by the policy evaluation framework 122 on the policy evaluation client computer 120 or any other component, as the invention is not limited in this respect. The policy evaluation process 700 may occur while a user is interacting with an Integrated Development Environment (IDE), a checkin dialog outside the IDE, or any other tool, as the invention is not limited in this respect. The policy evaluation process 700 may provide a real-time indication of whether source code that may be submitted to the source code repository satisfies associated policy requirements.

In act 710, process 700 retrieves the policy definitions for the enabled polices associated with the source code. As previously described, policies may be set to apply to all source code in a team project, and/or may possess a scope based on trees, branches or folders in the source code repository, versions of source code and/or specific source code files. As such, source code files being checked in may be associated with differing checkin policies, and process 700 may account for any differences in scope for each policy. Information relating to the enabled policies may be stored in the list of policies, which may reside on the policy storage server 130 or any other location, as the invention is not limited in this respect, and the policy definitions corresponding to the policies may also reside on the policy storage server 130 or elsewhere.

In act 720, process 700 receives current checkin information. The checkin information may include a list of source code files that may be submitted to the source code repository, a list of currently selected work items associated with the source code files, release note information, checkin comments, and any other information, as the invention is not limited in this respect. In some embodiments, an extensible checkin information system may be provided that enables the checkin information to be tailored. For example, a project or team leader may utilize the extensible checkin information system to specify additional checkin information that should be submitted for the checkin of source code for a project.

In act 730, policy compliance of the source code is evaluated. The policy compliance of the source code may be evaluated by calling policy plugins (e.g., 124 or 126) corresponding to the policy types of the enabled policies.

In act 740, policy compliance information may be displayed. In one embodiment, policy compliance information may be presented in a user interface either inside or outside an IDE.

Figure 7B:
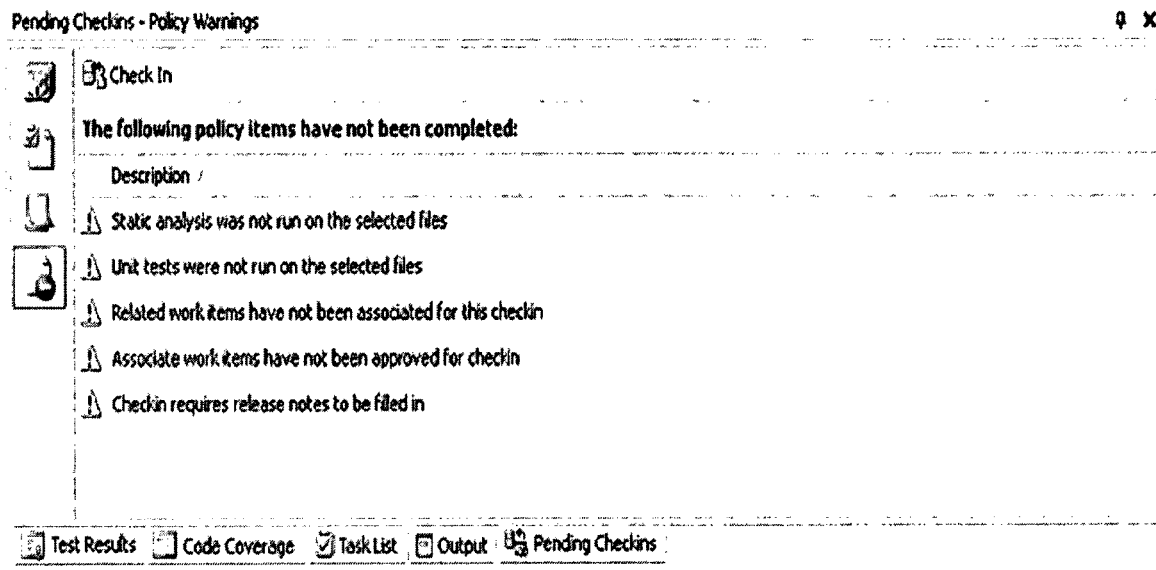
FIG. 7b is an illustration of a policy failure user interface in accordance with one embodiment of the invention.

FIG. 7b illustrates an embodiment of a policy failure user interface for displaying checkin policy failures, where entry in the policy failure user interface denotes an enabled policy that is currently not satisfied. It should be appreciated that FIG. 7b is an example of one policy failure user interface, but numerous other user interfaces are possible and the invention is not limited to the example. If all the enabled policies are currently satisfied, a single entry may be displayed with a description indicating that all checkin policies are currently satisfied.

The policy failure user interface may allow a user to select a policy failure to view more information. A selection event may invoke a method on the policy plugin (e.g., 124 or 126) associated with the selected policy. This method may be used to invoke the details for the failed policy so the user can get more information. Alternatively, the method may invoke a help system that provides an explanation of the failure and a description of how to fix it. Finally, the method may choose to initiate an activity that will resolve the policy failure. For example, if the policy failure is due to non-compliance with a static analysis and/or unit tests policy requirement, the activity that will resolve the policy failure would comprise running static analysis and/or unit tests.

When the policy is enabled but the corresponding policy plugin is not installed on the policy evaluation client computer 120 (or policy information is not present in embodiments not using policy plugins), the policy compliance may be considered to have failed. In such a case, a message may be displayed indicating that the policy plugin (e.g., 124 or 126) does not exist on the policy evaluation client computer 120. When the policy definition or the associated plugin includes information of a URL address where help and/or installation information may be retrieved, a message may be provided and selecting the policy failure message may invoke a web browser to navigate to the specified URL. When a URL is not included with a policy definition or the associated plugin, a message may be displayed indicating that a project administrator should be contacted for help with installing the policy.

Figure 8:
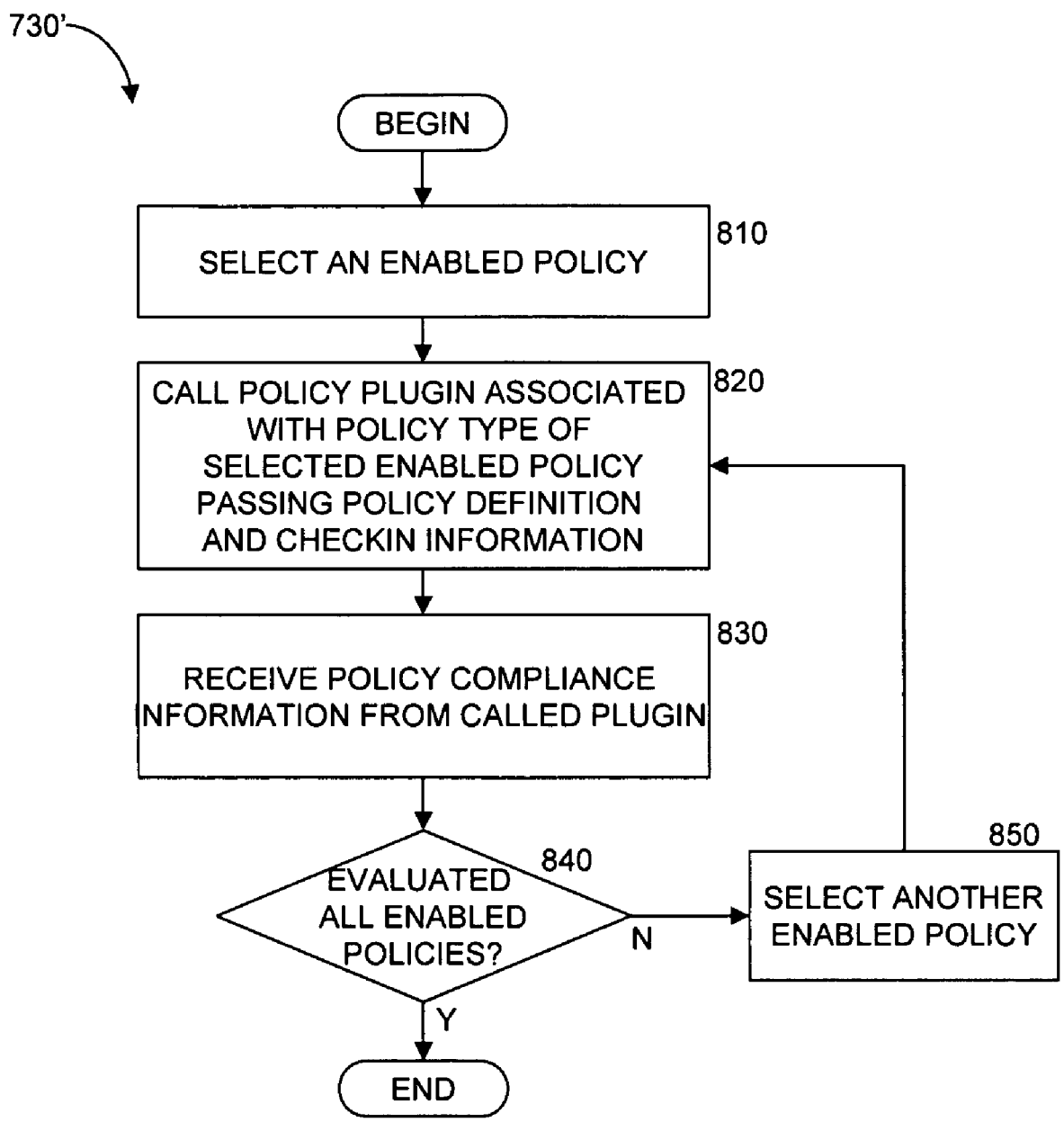
FIG. 8 is a flow chart showing a process for evaluating policy compliance using policy plugins in accordance with one embodiment of the invention.

FIG. 8 illustrates one embodiment of a process 730' for evaluating policy compliance using policy plugins. Process 730' is an example of a process that may be utilized to accomplish the policy compliance evaluation act 730 in process 700 (see FIG. 7a), but numerous other such processes are possible. Process 730' for evaluating policy compliance using policy plugins (e.g., 124 or 126) may be controlled by the policy evaluation framework 122 or any other component, as the invention is not limited in this respect. It should be appreciated that process 730', as well as other processes described herein, may be performed automatically (involving minimal or no user involvement) or semi-automatically (involving some manual involvement) by any manner of system, program, or any other component, as the invention is not limited in this respect.

Process 730' begins in act 810, where an enabled policy is selected. In act 820, the policy plugin associated with the policy type of the policy is called to evaluate the policy compliance.

Inputs to the policy plugin may include the policy definition associated with the policy and current checkin information. The policy definitions may be retrieved in act 710 of process 700, or in act 820 of process 730', as the invention is not limited in this respect. Similarly, the current checkin information may be retrieved in act 720 of process 700, or in act 830 of process 730', as the invention is not limited in this respect.

Upon receiving the inputs, the policy plugin (e.g., 124 or 126) evaluates policy compliance and returns policy compliance information which is received in act 830 of the process 730'. In act 840, process 730' determines whether all enabled policies have been evaluated. When the compliance with each of the enabled policies has not been evaluated, process 730' performs act 850 where another enabled policy (not already evaluated) is selected. Process 730' then performs acts 820 and 830 for the selected policy, and process 730' terminates when the compliance with each of the enabled policies has been evaluated.

Figure 9:
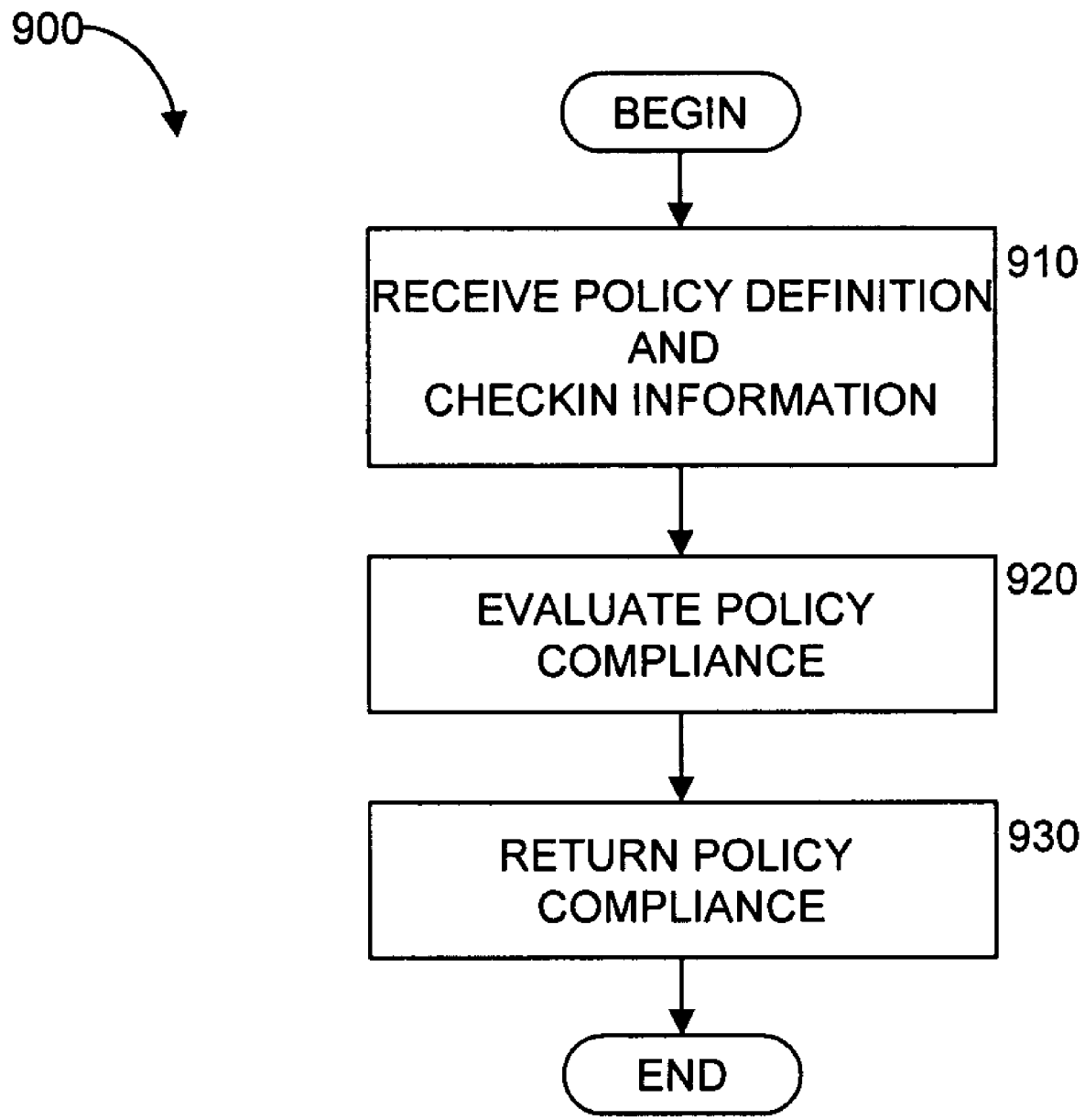
FIG. 9 is a flow chart showing a process performed by a policy plugin to evaluate compliance with a policy in accordance with one embodiment of the invention.

FIG. 9 illustrates one embodiment of a process 900 performed by a policy plugin (e.g., 124 or 126) when called to evaluate policy compliance, which is one example of an evaluation process performed by a plugin, but it should be understood that different approaches are possible. In one embodiment, the process 900 is called in act 820 of process 730' (see FIG. 8), although invention is not limited in this respect as process 900 may be called in other ways.

In act 910, the current checkin information and the policy definition may be received from a component or process calling the policy plugin (e.g., 124 or 126), or the policy plugin may retrieve the current checkin information and the policy definition from a specified location on the computer system. The policy definition may take the form of a serialized representation or any other representation, as the invention is not limited in this respect. The current checkin information may include a list of source code files that may be being submitted to the source code repository, a list of currently selected work items, release note information, checkin comments, and/or any other information, as the invention is not limited in this respect.

In act 920, policy compliance is evaluated based on the received current checkin information and the received policy definition, and in act 930, the policy compliance information is returned. The returned information may take any form, may indicate policy compliance failure or success, and may further indicate reasons for failure. In one embodiment, the returned information comprises a logical value indicating policy compliance failure or success.

Figure 10:
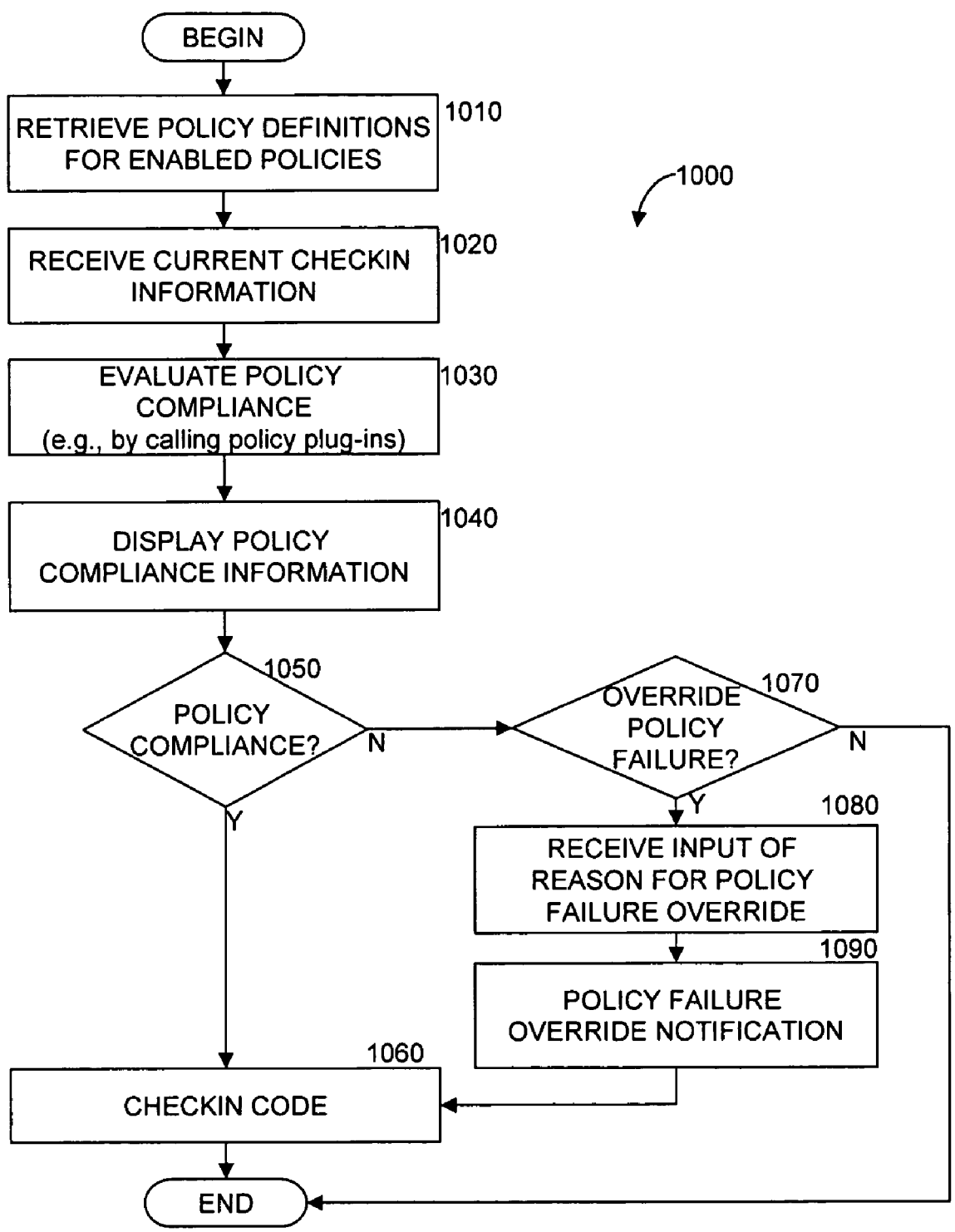
FIG. 10 is a flow chart showing a process for evaluating policy compliance and allowing for policy failure override in accordance with one embodiment of the invention.

FIG. 10 is a flow chart illustrating one embodiment of a policy evaluation and override process 1000 for evaluating policy compliance of source code that may be submitted to the source code repository, and allowing for policy override in case of one or more policy failures. Process 1000 is an example of a policy override process, and invention is not limited in to this example. The policy evaluation and override process 1000 may be controlled by the policy evaluation framework 122 on the policy evaluation client computer 120 or any other component, as the invention is not limited in this respect.

The policy evaluation and override process 1000 may be performed while a user is interacting with an Integrated Development Environment (IDE), with a checkin dialog outside the IDE, or with any other tool, as the invention is not limited in this respect. The policy evaluation and override process 700 may provide a real-time indication of whether the source code that may be submitted to the source code repository satisfies the policy requirements.

In act 1010, policy definitions are retrieved for the enabled polices. Information relating to the enabled policies may be stored in the list of policies, which may reside on the policy storage server 130 or any other location, as the invention is not limited in this respect. Similarly, the policy definitions corresponding to the policies may also reside on the policy storage server 130 or elsewhere.

In act 1020, current checkin information is received. The checkin information may include a list of source code files that may be submitted to a source code repository, a list of currently selected work items, release note information, checkin comments, and any other information, as the invention is not limited in this respect.

In act 1030, policy compliance of the source code is evaluated. In one embodiment, the policy compliance of the source code may be evaluated by calling policy plugins corresponding to the policy types of the enabled policies, as described for process 730', illustrated in FIG. 8.

In act 1040, policy compliance information may be displayed in a user interface either inside or outside the IDE, or in any other tool, as the invention is not limited in this respect. The policy compliance information may include a list of any policy failures, indication of the source code causing the policy failures, and/or any desired information, as the invention is not limited in this respect.

In act 1050, process 1000 proceeds to perform different acts based on the policy compliance results determined in 1030. When the source code being submitted is compliant with the enabled policies, process 1000 proceeds to checkin the source code to the source code repository, as indicated in act 1060.

When the source code being submitted is not compliant with one or more policies, process 1000 proceeds to act 1070, where a policy override option may be provided to allow for any policy failures to be overridden and the source code checked in. Act 1070 may be performed automatically or after a user indicates their desire to override the policy failure, as with a command-line prompt command or user interface. When the override option is not selected, the process 1000 terminates. In addition, the display may again show the list of policy failures (e.g., as in act 1040).

When the override option is selected, process 1000 proceeds to act 1080 where input from the user may be received. The input from the user may provide an explanation for the policy failure override. This may be useful, since it may force a developer to justify reason for policy override, but is not necessary in all embodiments.

In act 1090, a notification may be sent to one or more notification subscribers. For example, the notification subscribers may comprise one or more project leaders and managers. The notification may include a notice of the policy failure override and/or information provided by the user, and may be sent via email or in any other manner, as the invention is not limited in this respect. In act 1060, the source code is checked in. Alternatively, the source could may be checked in prior to sending the notification, as the invention is not limited in this respect.

Policy types may include a work item association policy type, a unit tests policy type, a static analysis policy type, and/or any other policy type, as the invention is not limited in this respect. These policy types are described below.

A work item association policy may specify that one or more work items are associated with a source code checkin, and may also specify criteria that the work items satisfy. Examples of work items include fixing specific bugs, accomplishing specific tasks, or any other activity, as the invention is not limited in this respect. When a work item policy is enabled, any source code submission may also be accompanied by an association with one or more work items. The work items may be defined by a project administrator managing the tasks related to a project. For example, a project administrator may indicate that a fix of a particular bug is a work item. A developer may then fix the bug by modifying a source code file and checkin the modified source code after associating the checkin with the appropriate bug fix work item.

A unit tests policy type may specify that one or more unit tests be performed on the source code, and may also specify that the tests were passed. Unit tests may include one or more tests performed on the source code that input test data and verify that the output is correct. The unit tests policy may receive information listing the unit tests, for example the unit tests policy may receive a file that defines one or more lists of tests and a reference to a single list to use for the checkin.

A static analysis policy type may specify that static analysis was performed on the source code being submitted. The static analysis policy type may also specify that there were no errors or warnings during the most recent build. Static analysis may include source code static analysis performed and/or binary code static analysis. Additionally, in one embodiment, the source code static analysis policy is configurable and may allow for the specification of which static analysis rules to run to satisfy the policy.

As described previously, policy plugins may be used to execute policy definition, policy evaluation, and any other processes related to a policy type. A policy framework (that may comprise a policy evaluation framework 112 and policy definition framework 122) may include a plugin model enabling third parties to provide their own policy plugins. Policy plugins may be installed either by themselves or as part of a third party application, and may be registered with the policy framework so that the plugins may be loaded as desired.

A policy plugin may be implemented as one or more managed assemblies that provide one or more classes implementing interfaces that may be used by the policy framework. Multiple policy plugins can be packaged in a single assembly or they can be provided separately.

A plugin may be split across multiple assemblies to allow for references to other assemblies to be satisfied differently based upon the operating environment. For example, a plugin may surface a different class for evaluating policies from a command line than that used within an IDE (e.g., Microsoft® Visual Studio® offered by Microsoft Corporation). These classes can be packaged in entirely different assemblies allowing the class used for policy evaluation in IDE to rely on the existence of managed Microsoft® Visual Studio Industry Partner (VSIP) interfaces without forcing the same dependency on the command line classes.

The policy framework may reflect on all registered assemblies in search of appropriately attributed classes that implement the interfaces that may be used for policy definition and/or evaluation, and these classes are instantiated as appropriate.

Figure 11:
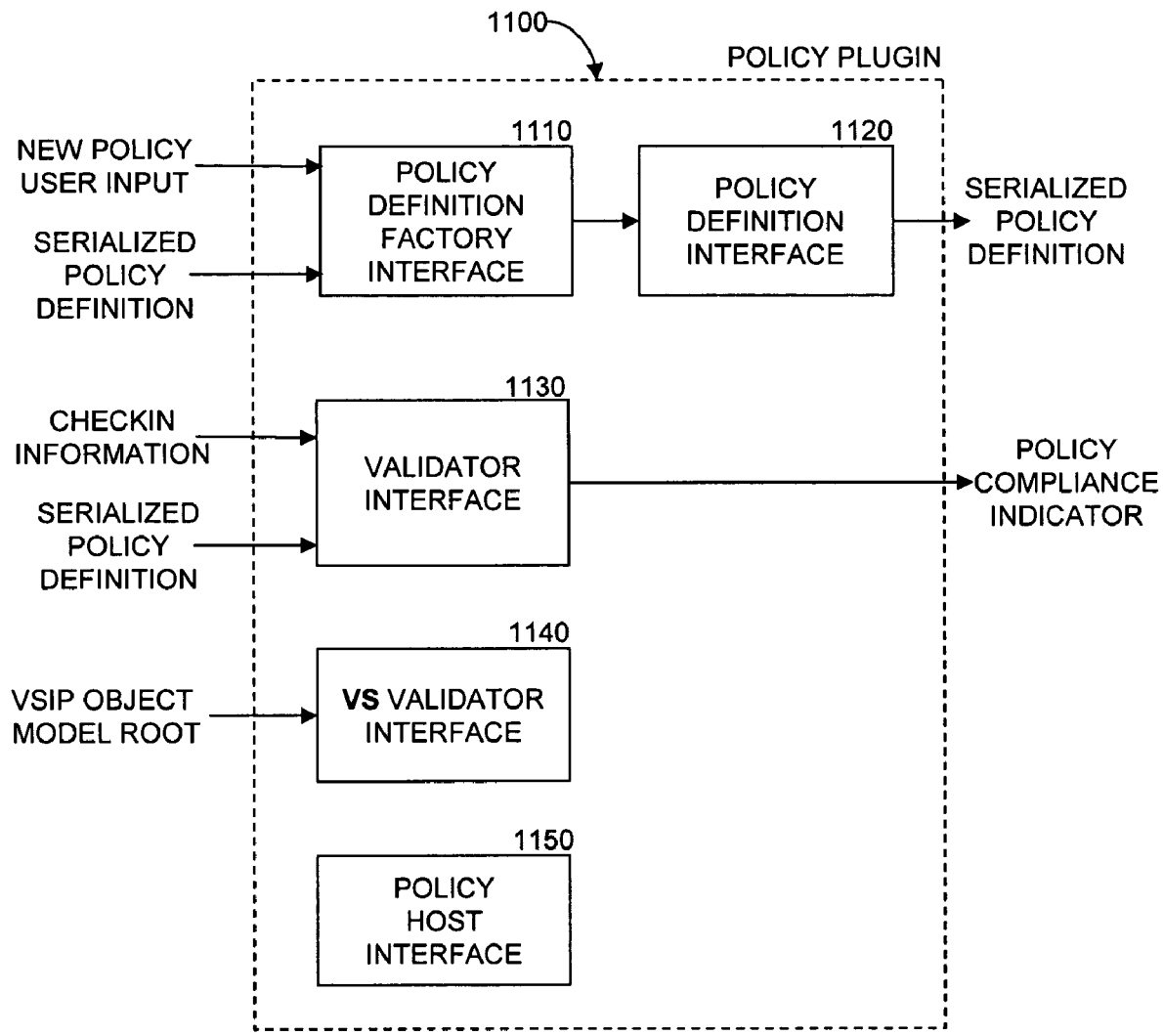
FIG. 11 is a block diagram of a policy plugin in accordance with one embodiment of the invention.

FIG. 11 illustrates one embodiment of policy plugin 1100 interfaces. It should be appreciated that this is an example, and other interfaces are possible, as the invention is not limited in this respect. The interfaces may include a policy definition factory interface 1110, a policy definition interface 1120, a validator interface 1130, a VS validator 1140, and a policy host interface 1150.

The policy definition factory interface 1110 may be used during a policy definition process, and may expose a policy type name, may surface a policy definition user interface specific to the plugin 1100, and may generate a policy definition object based on user input. When a user is perusing a list of the defined policies, a policy definition factory object (which is an instance of a class implementing the policy definition factory interface 1110) may parse a serialized policy definition and create policy definition objects. Cardinality for the policy definition factory interface 1110 is one created per installed checkin policy.

The policy definition interface 1120 may be created for each policy that is defined. A policy definition object (which is an instance of a class implementing the policy definition interface 1120) may be generated by a policy definition factory object in response to a process that defines a new policy or that processes a list of defined policies. The policy definition object represents a single instance of a defined policy, and exposes methods for interrogating the policy type and serializing the policy definition into a format that may persisted (e.g., transmitted and stored) by the policy framework. Cardinality of the policy definition interface 1120 is one created per defined checkin policy.

The validator interface 1130 may be used during a policy evaluation process, and may evaluate whether a checkin policy is satisfied. The validator interface 1130 may receive checkin information in conjunction with a policy definition (e.g., a serialized policy definition) and output a policy compliance indicator. The validator interface 1130 may also expose a method for acting upon a policy failure when a user selects a policy failure message. Cardinality of the validator interface 1130 is one created per defined checkin policy.

The VS validator interface 1140 may be used in conjunction with the validator interface 1130, and may provide a mechanism for the policy plugin 1100 to retrieve information about a VSIP environment so that the policy plugin 1100 may leverage the services exposed therein and potentially communicate with a particular VSIP package. The VS validator interface 1140 may exposes a method allowing the policy framework to expose a root of a VSIP object model. The VS validator interface 1140 may also provide a callback mechanism for the policy plugin 1100 to notify the policy framework that an event has occurred that may have altered policy compliance and that policy compliance should be re-evaluated.

The policy host interface 1150 may allow the policy plugin 1100 to retrieve information about the environment in which it is operating, and may be passed to the validator interface 1130. The policy host interface 1150 may expose information about the current version of policy framework as well as other non-VSIP specific environmental data. The policy host interface 1150 may also expose a method that may be used to force the policy framework to re-evaluate policy compliance when conditions external to the policy framework have been modified.

Policy plugin 1100 assemblies may be loaded as necessary at the initiation of a policy definition process, a policy evaluation process, a policy override process, or any other activity as the invention is not limited in this respect. The policy plugin 1100 assemblies may be unloaded at the conclusion of any the above activities or at any suitable time.

In one embodiment, an operating system registry may be used as a central location where checkin policy plugins 1100 can be registered and the policy framework can obtain information about the available plugins 1100, including information indicating a full path to the assembly implementing each policy plugin 1100. When a policy is split across multiple assemblies, each assembly may be registered independently. The framework may reflect on all policy plugin 1100 assemblies and load all those implementing the desired functionality.

To correlate policy plugins 1100 with policy definitions, each policy may identify itself with a Global Unique Identifier (GUID). The GUID may be noted as an attribute on any class implementing the policy definition factory interface 1110, and any class implementing validator interface 1130. The policy framework may store the GUID of the policy definition factory class that generated each policy definition. The GUID may later be used to identify the appropriate policy definition factory class or validator class for processing the policy definition.

Identification of policy plugins 1100 may implemented through the use of a policy type property on classes that implement the policy definition factory interface 1110 and the validator interface 1130. The value of the policy type property may be the GUID that uniquely identifies the policy type.

In one embodiment, a serialized policy definition may be an XML representation of settings in a policy that may generated by a policy definition object and may be processed a policy definition factory object and/or a validator object. Contents of the policy definition may be determined by an architect implementing the policy plugin 1100. For example, the policy definition may include specifications relating to the policy, a GUID (to associate the policy definition with policy definition factory 1110 and validator 1130 objects), information describing which files are missing when a plugin is not installed on a machine, URL information indicating the location of installation and/or help directions, and any other information, as the invention is not limited in this respect.

Figure 12:
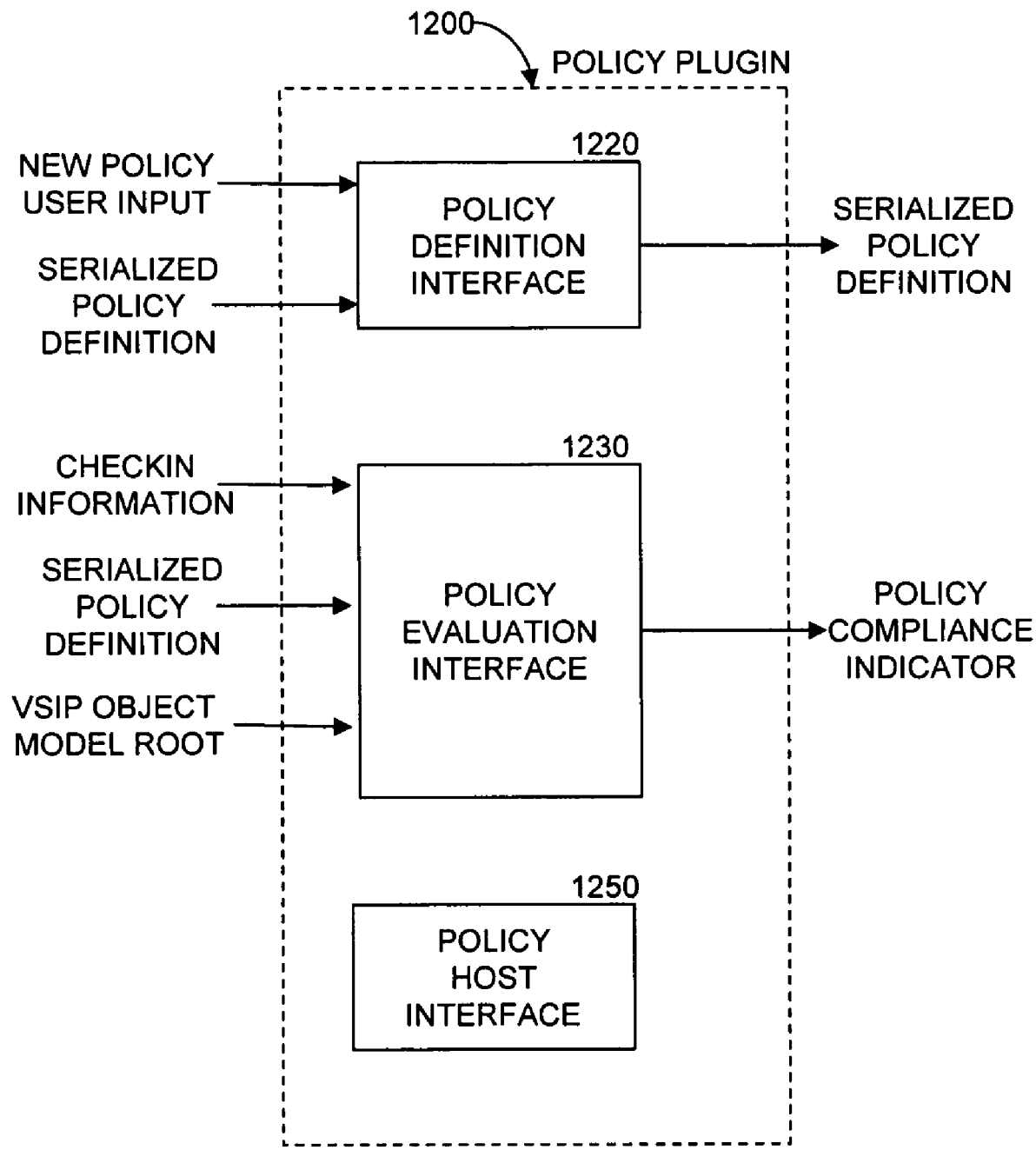
FIG. 12 is a block diagram of a policy plugin in accordance with one embodiment of the invention.

To emphasize that policy plugins may be implemented using various interfaces, FIG. 12 illustrates another embodiment of interfaces for a policy plugin 1200. As previously noted, this is an example, and other interfaces are possible, as the invention is not limited in this respect. The interfaces may include a policy definition interface 1220, a policy evaluation interface 1230, and a policy host interface 1250.

In the policy plugin 1200, the policy definition interface 1220 may be used during a policy definition process, and may expose a policy type name, a description of the policy type, a description of the behavior of an instance of a class implementing the policy definition interface 1220, a message to display when a policy definition is not available, and may surface a policy definition user interface specific to the plugin 1200 that allows a user to configure the properties of a policy definition. The policy definition interface 1220 may receive user input via the surfaced policy definition user interface that allows the policy definition interface 1220 to define a new policy and/or modify an existing policy based on an inputted serialized policy definition. Explicit serialization and de-serialization methods need no be present in the policy plugin 1200, since object serialization and de-serialization methods may be built into the programming framework (e.g., as in the Microsoft® .NET framework offered by Microsoft Corporation). It should also be appreciated that in the policy plugin 1200, a policy definition factory interface 1100 may not be present, as was the case for the policy plugin 1100, and some or all of the functionality and attributes present in the policy definition factory interface 1100 may be contained in the policy definition interface 1220.

The policy evaluation interface 1230 may be used during a policy evaluation process, and may evaluate whether a checkin policy is satisfied, and may also expose a method for acting upon a policy failure when a user selects a policy failure message. The policy evaluation interface 1230 may receive checkin information in conjunction with a policy definition (e.g., a serialized policy definition) and output a policy compliance indicator (e.g., including a list of any policy failures). The policy evaluation interface 1230 may also provide a mechanism to retrieve information about a VSIP environment so that the policy plugin 1200 may leverage the services exposed therein and potentially communicate with a particular VSIP package. It should be appreciated that in the policy plugin 1200, a VS validator interface 1140 may not be present, as was the case for the policy plugin 1100, and some or all of the functionality and attributes present in the VS validator interface 1140 may be contained in the policy evaluation interface 1230.

The policy host interface 1250 may allow the policy plugin 1200 to retrieve information about the environment in which it is operating, and may be passed to the evaluation interface 1230. The policy host interface 1250 may expose information about the current version of policy framework as well as other non-VSIP specific environmental data. The policy host interface 1250 may also expose a method that may be used to force the policy framework to re-evaluate policy compliance when conditions external to the policy framework have been modified.

It should also be appreciated that aspects of the plugin assembly loading, unloading, registration, identification described in the context of policy plugin 1100 may apply to the example of the policy plugin 1200, as well as to other implementations of policy plugins.

As should be appreciated from the foregoing, there are numerous aspects of the present invention described herein that can be used independently of one another, including the aspects that relate to defining checkin policies, disseminating checkin policies, evaluating checkin policies, displaying policy compliance information, enforcing policies during a checkin process, overriding one or more policy failures, providing notification of policy failure overrides, enabling an extensible checkin policy framework enabling the creation of new policy types, providing notification that the appropriate policy types are not installed on a client computer, and enabling a work item association policy type, a unit tests policy type and a static analysis policy type.

However, it should also be appreciated that in some embodiments, all of the above-described features can be used together, or any combination or subset of the features described above can be employed together in a particular implementation, as the aspects of the present invention are not limited in this respect.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

It should be appreciated that the various methods outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code. In this respect, it should be appreciated that one embodiment of the invention is directed to a computer-readable medium or multiple computer-readable media (e.g., a computer memory, one or more floppy disks, compact disks, optical disks, magnetic tapes, etc.) encoded with one or more programs that, when executed, on one or more computers or other processors, perform methods that implement the various embodiments of the invention discussed above. The computer-readable medium or media can be transportable, such that the program or programs stored thereon can be loaded onto one or more different computers or other processors to implement various aspects of the present invention as discussed above.

It should be understood that the term "program" is used herein in a generic sense to refer to any type of computer code or set of instructions that can be employed to program a computer or other processor to implement various aspects of the present invention as discussed above. Additionally, it should be appreciated that according to one aspect of this embodiment, one or more computer programs that, when executed, perform methods of the present invention need not reside on a single computer or processor, but may be distributed in a modular fashion amongst a number of different computers or processors to implement various aspects of the present invention.

Various aspects of the present invention may be used alone, in combination, or in a variety of arrangements not specifically discussed in the embodiments described in the foregoing, and the aspects of the present invention described herein are not limited in their application to the details and arrangements of components set forth in the foregoing description or illustrated in the drawings. The aspects of the invention are capable of other embodiments and of being practiced or of being carried out in various ways. Various aspects of the present invention may be implemented in connection with any type of network, cluster or configuration. No limitations are placed on the network implementation.

Accordingly, the foregoing description and drawings are by way of example only.

Also, the phraseology and terminology used herein is for the purpose of description and should not be regarded as limiting. The use of "including," "comprising," or "having," "containing," "involving," and variations thereof herein, is meant to encompass the items listed thereafter and equivalent thereof as well as additional items.

What is claimed:

1. A method for use in a computer system, the computer system comprising a source code repository that stores checked in source code, at least one checkin policy, at least one policy plugin, and at least one source code file to be submitted to the source code repository, the method comprising acts of:

(A) creating a policy definition based on user input defining the at least one checkin policy, the policy definition being based on a policy plugin on a policy definition client computer;

(B) storing the policy definition in a policy definition store and subsequently transmitting the policy definition to a policy evaluation client computer;

(C) automatically evaluating compliance of the at least one source code file with the at least one checkin policy at the policy evaluation client computer, the at least one policy plugin being identified based on the policy definition, and the at least one policy plugin performing the act (C);

(D) providing information to a user about compliance or non-compliance of the at least one source code file with the at least one checkin policy;

(E) providing to the user an option to enable a non-compliant source code file to be checked in to the source code repository;

(F) in response to the user selecting the option to enable the non-compliant source code file to be checked into the source code repository, checking in the non-compliant source code file into the source code repository and providing notification to at least one notification subscriber of the checkin of the non-compliant source code file into the source code repository; and (G) automatically evaluating compliance of the at least one source code file with at least one additional checkin policy, wherein the computer system further comprises an extensible framework enabling the installation of an additional policy plugin, the additional policy plugin performing the act (G).

2. The method of claim 1, wherein the act (C) is performed in real-time within an integrated development environment.

3. The method of claim 1, wherein the act (C) is performed prior to a request to checkin the at least one source code file.

4. The method of claim 1, wherein the at least one checkin policy possesses a scope, and wherein the act (C) is only performed when the at least one source code file is within the scope of the at least one checkin policy.

5. The method of claim 1, further comprising acts of:
(H) determining that the at least one policy plugin is not installed; and
(I) providing a notification to the user that the at least one policy plugin is not installed.

6. The method of claim 1, wherein the at least one policy plugin comprises a work item association policy plugin.

7. The method of claim 1, wherein the at least one policy plugin comprises a unit tests policy plugin.

8. The method of claim 1, wherein the at least one policy plugin comprises a static analysis policy plugin.

9. At least one computer readable-medium encoded with a plurality of instructions in a computer system, the computer system comprising a source code repository that stores checked in source code, at least one checkin policy, and at least one source code file to be submitted to the source code repository, the plurality of instructions, when executed, performing a method comprising acts of:
(A) creating a policy definition based on user input defining the at least one checkin policy, the policy definition being based on a policy plugin on a policy definition client computer;
(B) storing the policy definition in a policy definition store and subsequently transmitting the policy definition to a policy evaluation client computer;
(C) identifying based on the policy definition the at least one policy plugin and automatically evaluating compliance of the at least one source code file with the at least one checkin policy;
(D) providing information to a user about compliance or non-compliance of the at least one source code file with the at least one checkin policy;
(E) providing to a user an option to enable a non-compliant source code file to be checked in to the source code repository; and
(F) in response to the user selecting the option to enable the non-compliant source code file to be checked into the source code repository, checking in the non-compliant source code file into the source code repository and providing notification to at least one notification subscriber of the checkin of the non-compliant source code file into the source code repository,
wherein the computer system further comprises an extensible framework enabling the installation of the at least one policy plugin, the at least one policy plugin performing the act (C).

10. A plurality of computers for use with a computer system comprising a source code repository that stores checked in source code, at least one checkin policy, and at least one source code file to be submitted to the source code repository, the plurality of computers comprising at least one processor programmed to:
create a policy definition based on user input defining the at least one checkin policy, the policy definition being based on a policy plugin on a policy definition client computer;
store the policy definition in a policy definition store and subsequently transmitting the policy definition to a policy evaluation client computer;
identify based on the policy definition the at least one policy plugin and automatically evaluate compliance of the at least one source code file with the at least one checkin policy;
provide a user information about compliance or non-compliance of the at least one source code file with the at least one checkin policy;
provide to a user an option to enable a non-compliant source code file to be checked in to the source code repository; and
in response to the user selecting the option to enable the non-compliant source code file to be checked into the source code repository, check in the non-compliant source code file into the source code repository and provide notification to at least one notification subscriber of the checkin of the non-compliant source code file into the source code repository,
wherein the computer system further comprises an extensible framework enabling the installation of at least one policy plugin, the at least one policy plugin enabling the automatic evaluation of compliance of the at least one source code file with the at least one checkin policy.

* * * * *